No. 851,614. PATENTED APR. 23, 1907.
E. H. BUMP.
FAT CUTTING MACHINE.
APPLICATION FILED FEB. 20, 1906.
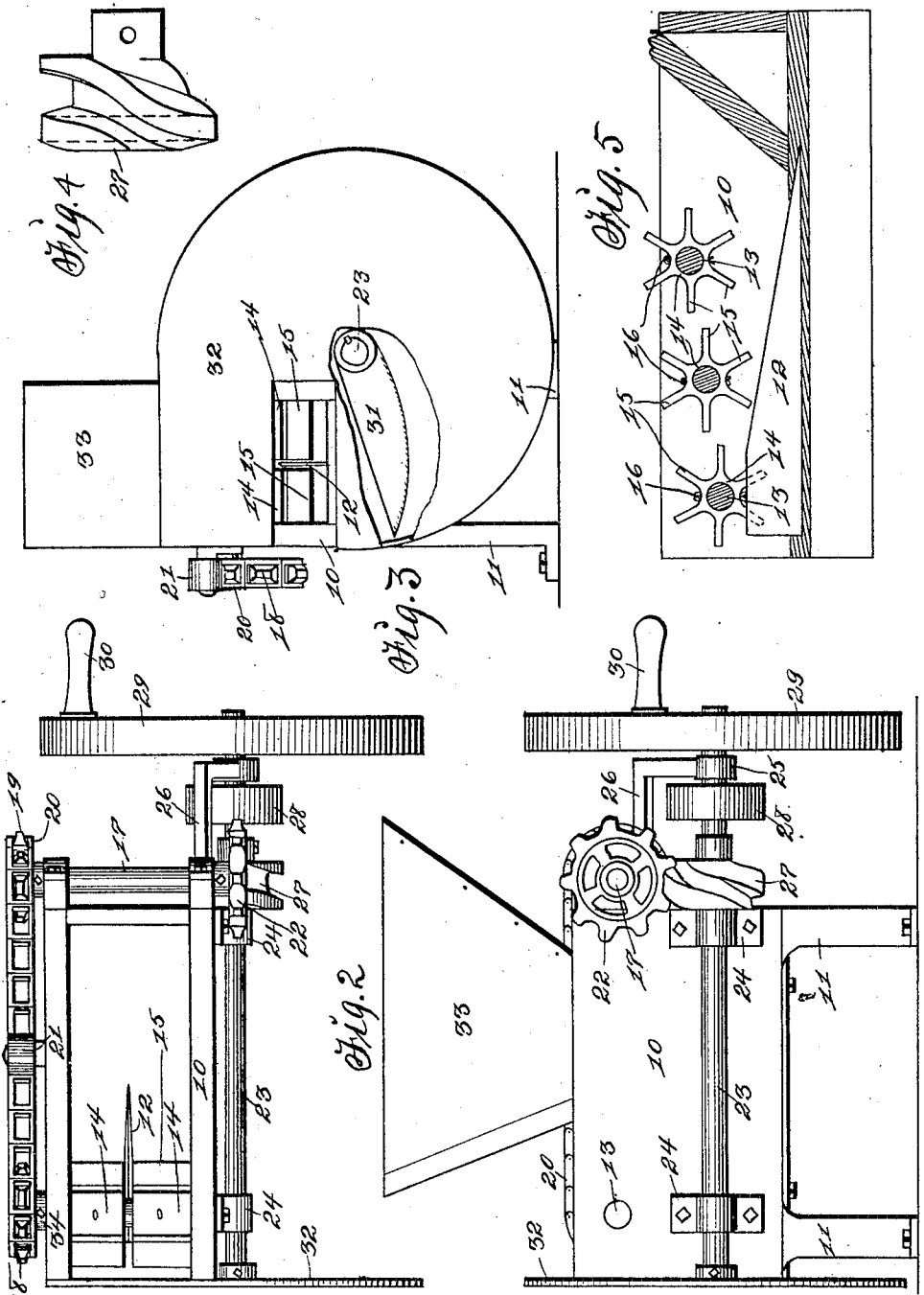

UNITED STATES PATENT OFFICE.

EVERETT H. BUMP, OF GRINNELL, IOWA.

FAT-CUTTING MACHINE.

No. 851,614.  Specification of Letters Patent.  Patented April 23, 1907.

Application filed February 20, 1906. Serial No. 302,271.

*To all whom it may concern:*

Be it known that I, EVERETT H. BUMP, a citizen of the United States of America, and a resident of Grinnell, Poweshiek county, Iowa, have invented a new and useful Fat-Cutting Machine, of which the following is a specification.

The object of this invention is to provide improved means for cutting substance such as pork fat preparatory to rendering the grease therefrom.

My invention consists in the construction, arrangement and combination of elements hereinafter set forth, pointed out in my claims and illustrated by the accompanying drawing, in which—

Figure 1 is a plan of the machine without the hopper. Fig. 2 is a side elevation of the complete machine. Fig. 3 is a front end elevation of the machine, a portion of a knife-shield being broken away. Fig. 4 is a detail view of a feeding worm and cam detached from the machine. Fig. 5 is a view illustrating the use of a plurality of feed rolls in the machine.

In the construction of the machine as shown the numeral 10 designates a box mounted on a suitable support such as legs or standards 11. The box 10 is open at its top and one end and preferably is rectangular in form. A splitting knife 12 is mounted removably and replaceably in the bottom of the box 10 adjacent one end thereof, and said knife extends longitudinally of the box with its cutting edge inclined upwardly and rearwardly. A shaft 13 is mounted for rotation in and transversely of the open end portion of the box 10 and feed rolls 14, 14, of like construction, are mounted on said shaft. Each feed roll 14 is formed with radial teeth or blades 15 of considerable radius and is detachably connected to the shaft 13 by a split key 16 extending through said roll and shaft. The rolls 14 are spaced apart slightly on the shaft 13 and the splitting knife 12 rises between them nearly to the shaft. A counter-shaft 17 is mounted for rotation in bearings formed on or fixed to the closed end of the box 10, and said shaft crossed said box parallel with the shaft 13. Sprocket wheels 18, 19 on the outer end portions of the shafts 13, 17 are connected by a sprocket chain 20, and a tightener 21 adjustably mounted on the box 10 engages and is adapted to take up the slack of the chain. A worm gear 22 is mounted rigidly on the end portion of the shaft 17 opposite the wheel 19. A drive shaft 23 is mounted for rotation in bearings 24 fixed to the front wall of the box 10 and a bearing 25 formed on a bracket 26 fixed to and extending from the closed end of the box, and a worm 27 is mounted on said shaft and engages the worm gear 22. A pulley 28 is mounted on the shaft 23 between the bearing 25 and box 10 and may receive power by belting from a prime mover not shown. A balance wheel 29 is mounted on the end portion of the shaft 23 adjacent the bracket 26 and a handle 30 is mounted on said wheel and adapts it for manual operation. A knife 31 is mounted removably and replaceably on the rear end portion of the shaft 23 and extends at right angles thereof. The knife 31 is of such length that it may extend across the open end portion of the box 10. A shield 32 is mounted on the shaft 23 and fixed to the open end portion of the box 10 and incloses the knife 31 throughout the major portion of its orbit, an opening formed transversely of the shield, as shown in Fig. 3, providing for the passage of the fat or other substance being cut. A hopper 33, of any desired construction, may be mounted on the upper portion of the box 10 to receive and support the strips of fat, or other substance, being cut.

The worm 27 is so shaped that it will engage and rotate the worm gear 22 during a part of each revolution of the shaft, and will engage and hold said gear stationary during the remaining part of each revolution, and while the worm is holding the gear stationary the shaft 23 carries the knife 31 across the open end of the box 10. Hence, in practical use, the strip of fat to be cut is placed in the hopper and box, skin-side down, and the rolls 14 engage and mash into the fat thereof and feed the strip beneath the rolls and toward the open end of the box, in so doing causing the strip to engage and be split by the knife 12. The feeding of the strip will be intermittent, occurring only during the operations of the gear 22 by the worm 27, and alternating with such feeding the knife 31 will cross the path of travel of the strip and when said strip has been fed a predetermined distance, about one inch, through the open end of the box the said knife cuts said strip transversely. The operations of feeding and transversely cutting the strip continue alternately until said strip, and successive similar strips to the desired quantity have been treated and reduced to relatively small and identical chunks, in the most desirable form for rendering.

The sprocket wheel 18 is attached to the shaft 13 by a split key 34, and said key and the keys 16 may be withdrawn and the shaft, rolls and knife be removed from the box for cleansing at desired intervals.

In treating very heavy strips I may employ a plurality of the shafts 13 and a corresponding greater number of rolls 14 (see Fig. 5) set to operate at different altitudes relative to the bottom of the box 10, whereby the engagement of rolls with the strip may be progressively firmer and greater power be applied to the feeding of the strip. In like manner I may employ a greater number of rolls and a greater number of splitting knives 12 in respect of each shaft 13, to accommodate wider strips of substance.

I claim as my invention—

A fat-cutting machine, comprising a receptacle open at one end, a driving shaft mounted for rotation on one side of said receptacle, a cutting knife mounted on one end of said shaft and arranged for travel across the open end of the receptacle, a feed shaft mounted transversely of the receptacle, feed rolls mounted on said feed shaft, a splitting knife mounted centrally and longitudinally of said receptacle and rising between said feed rolls, a counter shaft mounted transversely of the closed end portion of said receptacle, sprocket connections between the feed shaft and counter-shaft, a worm gear on the counter shaft and a mutilated worm on the driving shaft engaging said worm gear, whereby the cutting knife is rotated continuously and the feeding devices are operated intermittently.

Signed by me at Des Moines, Iowa, this eighth day of February, 1906.

EVERETT H. BUMP.

Witnesses:
 S. C. SWEET,
 L. L. LEIBROCK.